United States Patent [19]

Larrabee, Jr. et al.

[11] Patent Number: 5,788,843
[45] Date of Patent: Aug. 4, 1998

[54] METHOD AND INSTALLATION FOR TREATING WATER

[76] Inventors: Carl Richard Larrabee, Jr., 2622 Horseshoe Ct., Cocoa, Fla. 32926; David Alan King, 948 Sable La., Rockledge, Fla. 32955; Everett John Wegerif, 1525 S. Oaks Dr., Merritt Island, Fla. 32952; William Powell Nairn, 704 S.E. 4th Ave., Gainesville, Fla. 32601; Hershel Williamson, 2105 Muskingum Ave., Cocoa, Fla. 32926; Gary Lynn Heller, 807 Topaz Dr., Rockledge, Fla. 32955; Glynn Alan Leffler, 4000 Ocala St., Cocoa, Fla. 32926

[21] Appl. No.: 893,558

[22] Filed: Jul. 11, 1997

[51] Int. Cl.[6] .......................... C02F 1/20; C02F 3/02
[52] U.S. Cl. .................. 210/620; 210/631; 210/750; 210/751; 210/758; 210/218; 210/150; 95/245; 96/202
[58] Field of Search .......................... 210/620, 631, 210/754, 750, 758, 150, 151, 199, 218–220, 256; 95/245; 96/202

[56] References Cited

U.S. PATENT DOCUMENTS 2,200,580  2/1940  Pruss et al. ........................... 210/7
3,202,167  8/1965  Young et al. ........................ 137/173
4,371,434  2/1983  Clarke ................................ 210/218
4,384,875  5/1983  Batteux et al. ....................... 96/202
4,518,403  5/1985  Hertz ................................. 210/151
4,613,347  9/1986  Ranchet et al. ...................... 96/202
5,203,286  4/1993  Yousset .............................. 96/202
5,683,587  11/1997 Ferrara et al. ...................... 210/750

*Primary Examiner*—Thomas G. Wyse
*Attorney, Agent, or Firm*—Dennison, Meserole, Pollack & Scheiner

[57] ABSTRACT

A structure for treating water used in public water supplies for removing dissolved gases. The installation includes a closed outer tank for storage of water and a vented inner tank for water aeration contained at least partially within the outer tank. The inner tank includes a column of packing media for aerating the water which is delivered from the ground water source to a point above the column. A flow of air is delivered into the outer tank above the water level, and an air inlet causes air to flow into the inner tank and through the column in counter-current flow to the water. The air is then vented to the atmosphere.

20 Claims, 3 Drawing Sheets

METHOD AND INSTALLATION FOR TREATING WATER

BACKGROUND OF THE INVENTION

The invention relates to the field of treatment of water used for a public water supply.

Many public water systems obtain their water from an underground aquifer. Water obtained from a underground aquifer is especially prone to contain dissolved gases, in particular hydrogen sulfide and carbon dioxide. Both of these gases are objectionable, with hydrogen sulfide being particularly objectionable as it smells like rotten eggs, causes steel plumbing and fixtures to deteriorate, causes bacterial growth leading to taste and odor problems, adversely affects industrial, commercial and medical water uses, interferes with disinfection by consuming chlorine, and combines with other elements to corrode concrete storage tanks above the water line. Carbon dioxide is also objectionable as it creates a demand for lime in the water softening process, which results in a lime sludge without actual reduction in water hardness.

An aeration process is typically used to reduce the concentrations of hydrogen sulfide and carbon dioxide in public water supplies. Typical aeration facilities used to reduce the concentrations of these gases include a square, rectangular or cylindrical tower constructed as a free-standing structure or on top of a circular tank. Water is delivered by pump to the top of the aerator and distributed over trays or other packing media to minimize droplet size and water film thickness while maximizing surface area for air contact and gas transfer. Air is forced through the aerator by fans utilizing positive or negative air pressure. Typical aerator efficiencies for removal of these gases is 40% to 60% when the initial concentration of hydrogen sulfide is 5 to 9 mg/l, the initial concentration of carbon dioxide is 15 to 20 mg/l, and air to water ratios are between 8:1 and 19:1.

SUMMARY OF THE INVENTION

It is an object of the present invention to improve the efficiency of gas removal in an aeration process.

Further objects of the invention are to reduce construction costs, reduce operating and maintenance costs, and increase operational flexibility in an aeration process.

In order to achieve these and other objects, the invention provides a structure for aerating water to remove dissolved gases therefrom, based on a closed outer tank for water storage and a vented inner tank for water aeration, the inner tank contained at least partially within the outer tank and having an outer wall extending above and below the maximum level for water storage in the outer tank. Means are provided for delivering water to be aerated to the inner tank, including a distributor positioned in an upper portion of the inner tank. Below the water delivery means is a column of packing media for aerating the water, the water being allowed to trickle from the outlet over and through the column for aeration treatment. A pipe located below the column connects the inner tank and the outer tank to allow the aerated water to pass into the outer tank for storage and in such a way as to permit the outer tank to be self-cleaning. Water is removed from the outer tank by means of an outlet pipe.

Means are provided for delivering an air flow into the outer tank in the space above the water stored in the outer tank, and inlets are provided between the space above the stored water and the inner tank below the column of packing media to permit air to pass from the outer tank to the inner tank and through the column of packing media in counter-current flow to the water trickling through the column. The air then passes through a vent to the atmosphere.

The invention provides a method for removing dissolved gases from water comprising distributing water to be treated in an upper portion of the inner tank, aerating the water by allowing the water to trickle down over a column of packing media in the inner tank, passing the aerated water from the inner tank to the outer tank for storage, and providing a flow of air into the outer tank above the water storage level, passing the air into the inner tank below the column of packing material, through the column in counter-current manner to the water, and to the atmosphere.

The inner tank is an aeration tower on its own footer located in the center of the larger storage tank. Locating the aeration tower in this manner provides the following benefits: reduced area needing soil stabilization, reduced footprint of the impervious area, lower hydraulic losses between the tanks, reduced exterior coatings, reduced concern about leakage, reduced piping and valving, increased water detention time for oxidation of hydrogen sulfide and for chlorination prior to storage in the tank, and reduced height of packing media.

Moreover, locating the water distributor at the top of the aeration tower provides automatic adjustment of the location and number of water application points as the flow increases in order to evenly distribute the water and improved efficiency of gas transfer from water to air throughout the flow range by minimizing short circuiting of water through the packing media and localized hydraulic overloading of the packing media.

The tanks are generally cylindrical in shape, although other shapes such as square or rectangular may be used.

The installation and method of the invention are particularly advantageous as they allow for cleaning of the tower packing media in place. Because the packing media gradually develops both a biological growth and a chemical scale and is subject to physical breakdown from the action of water impact, periodic cleaning and redistribution of the packing media is beneficial every 6 to 12 months. Even though the effectiveness of the packing media is not diminished by the biological film growth and may possibly be enhanced due to increased wetting area and biological oxidation of hydrogen sulfide, more air pressure is necessary to move air through the packing media, thereby increasing the power consumed by the treatment plant. In order to clean the packing media, the outlet valve of the aeration tank is closed, the inlets are closed, and a cleaning medium, usually chlorinated water, is passed through the input line to submerge the packing media. The water level is increased four feet above the normal height of the top of the packing media, which floats, and an agitating fluid flow, generally compressed air, is introduced below the packing media to create an upward movement of water to gently roll and agitate the packing media and remove built-up solids. Not only does this effectively remove both the biological and chemical accumulations, it also alters the arrangement of the packing media to change the weight, loading points, and amount of damage to the packing media caused by its own weight and increase the useful life of the media. This cleaning method also results in reduced down time and labor and reduced damage to the packing media that would be experienced if the packing media were physically removed, cleaned and replaced.

It is anticipated that the packing media will need to be replaced every five to seven years. For that reason, the wall of the inner tank has a hatch above the roof of the outer tank that can be opened to remove the packing media. Air inlets and water outlet are closed; then the water level is increased to float the packing media up to the level of the hatch. The packing media spills out onto the tank roof and slides down the slope of the roof to a chute which will direct it into trucks.

The roof of the inner tank is also removable for replacing the packing media. Raising the water in the inner tank to its maximum level, then slowly lowering the water level, allows for gentle replacement of the packing media.

The apparatus of the invention has been found to provide a greater degree of removal of hydrogen sulfide than would be expected by aeration, as a result of biological action which occurs on the packing media, decomposing the hydrogen sulfide.

DESCRIPTION OF THE PREFERRED EMBODIMENTS

Figure 1:
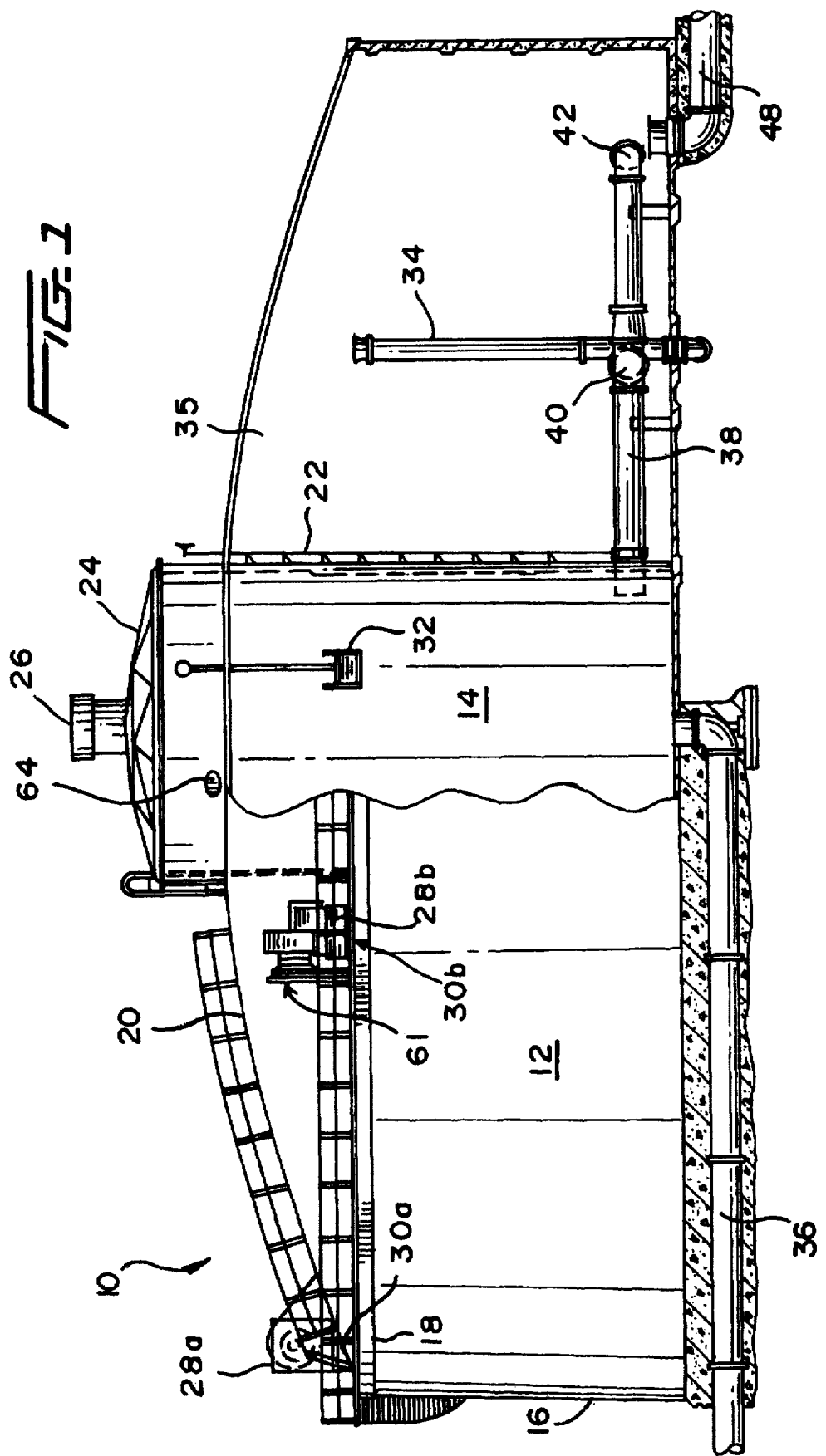
FIG. 1 is an elevation view in partial cross-section of the structure of the invention.

FIG. 1 shows structure 10 according to the invention including an outer cylindrical tank 12 and an inner cylindrical tank 14 located concentrically within the outer tank. The outer tank includes an outer wall 16 and a roof 18 including a centrally raised portion 20. The inner tank includes a wall 22 and a roof 24 in the form of a dome having a vent 26 centrally located therein. Both tanks are formed of concrete or other suitable materials.

In FIG. 1, a series of fans (28a and 28b) is located on roof 18 of the outer tank. The forced air output of the fans is blown into the outer tank through vents 30a and 30b. The fans draw air through a filtering device 61 to preclude the entrance of foreign material into the storage tank. Air from the fans passes from the outer tank to the inner tank by means of air inlets 32 in wall 22 of the inner tank.

Figure 2:
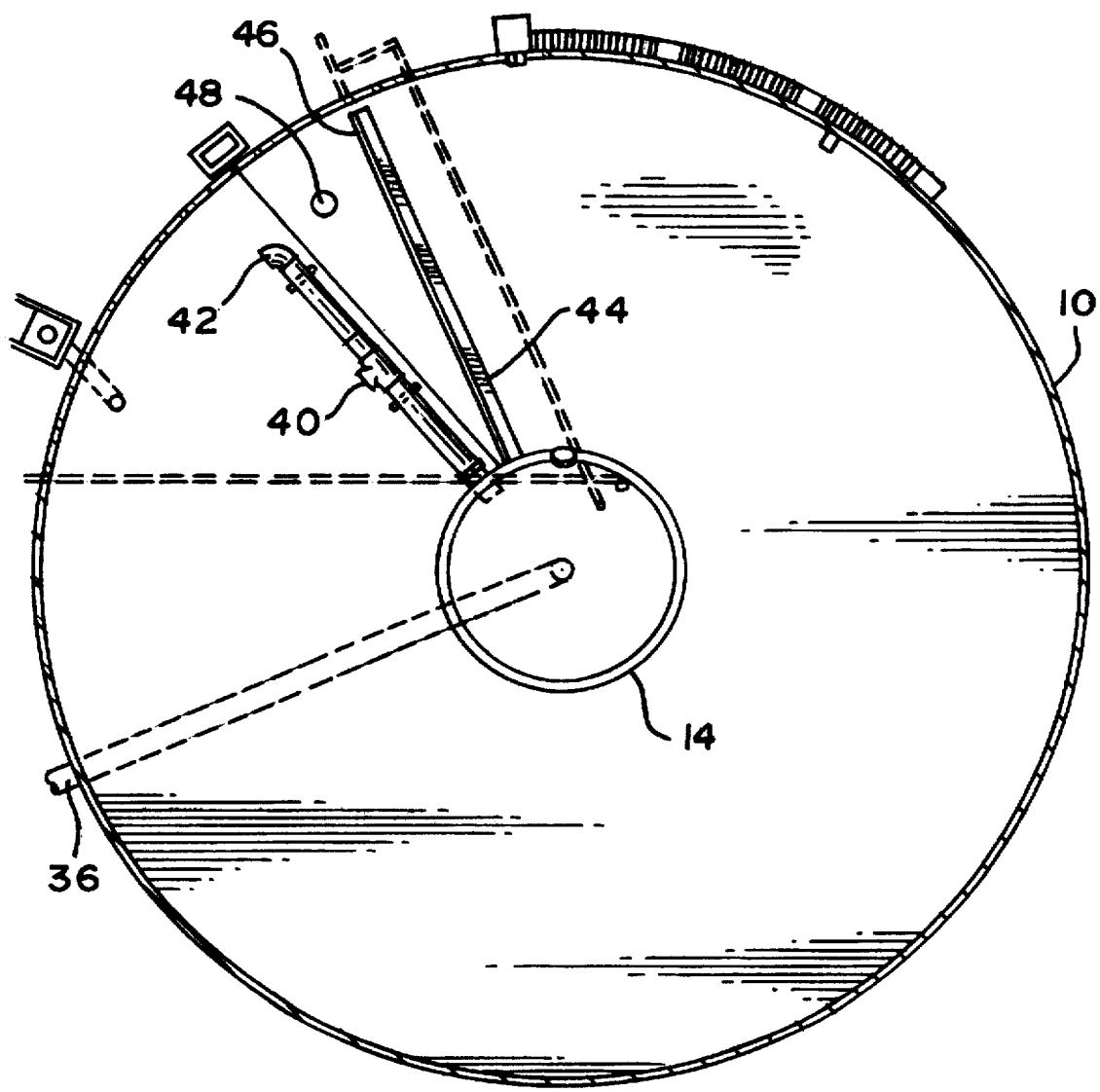
FIG. 2 is a plan view in cross-section of an aeration and storage tank of the invention.

The maximum water level in the outer tank 12 is established by an overflow pipe 34 with a weighted cover to prevent the escape of air. A space 35 is defined above the maximum water level. Ground water to be aerated enters the inner tank 14 through a pipe 36 and exits the inner tank to the outer tank for storage through a pipe 38. Pipe 38 includes two orifices 40 and 42 which induce a circular water movement within the outer tank. This movement enables solids that slough off the packing medium and settle in the outer tank to move along the bottom of the tank to a recessed rectangular channel 44, shown best in FIG. 2. This rectangular channel is perpendicular to the tank outer wall. A perforated drainage pipe 46 is placed in the channel and used to vacuum deposited solids from the tank when the drain valve is open. Thus, the tank does not have to be removed from service for cleaning and no personnel are required to enter the tank to clean it.

An outlet pipe 48 is placed in the floor of the outer tank to remove the stored water therefrom.

Figure 3:
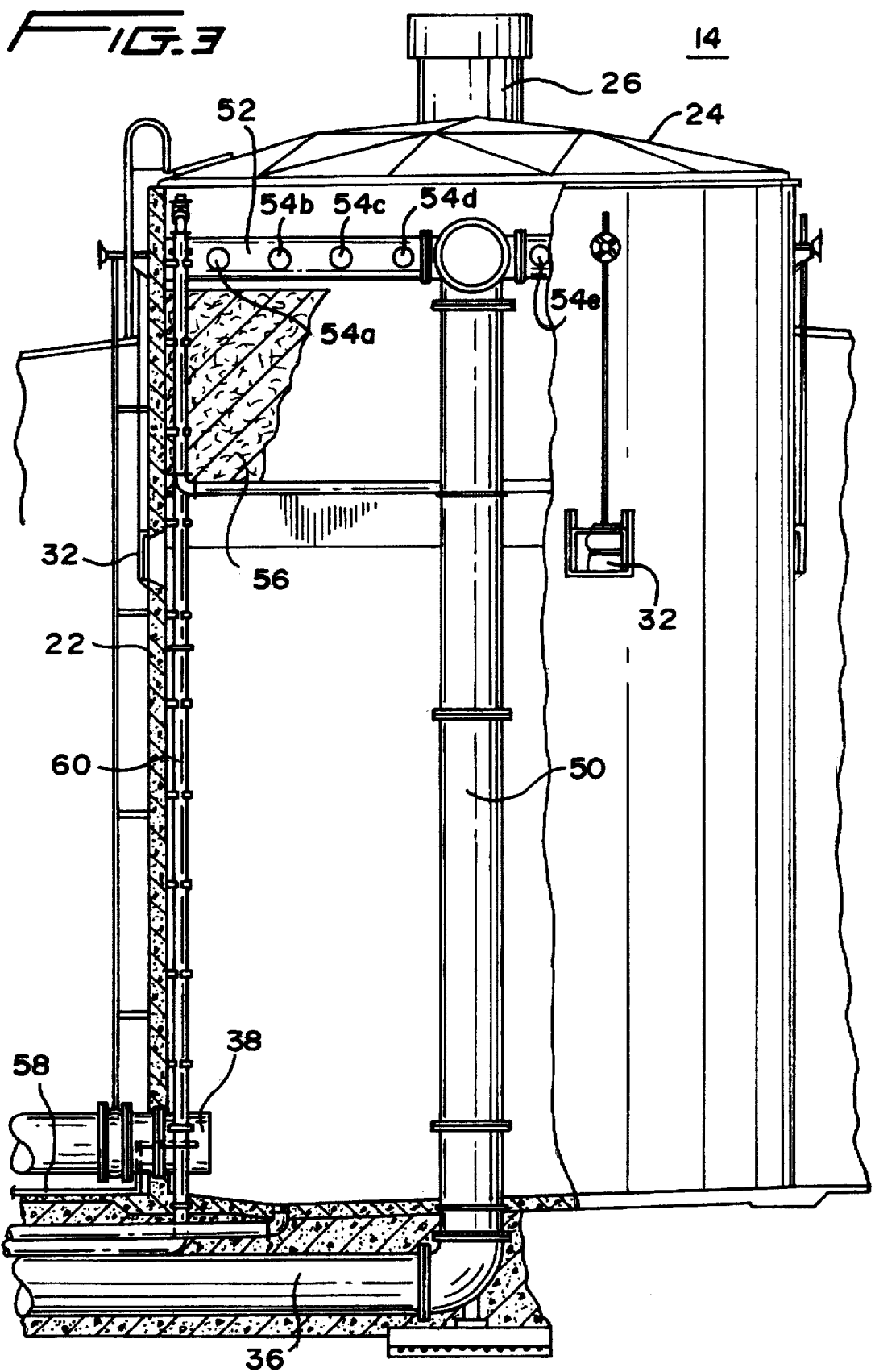
FIG. 3 is an elevation in partial cross-section in detail of an aeration tank according to the invention.

The inner tank aeration tower 14 is shown in detail in FIG. 3. A vertical pipe 50 connects to inlet pipe 36 and is used to carry water to distributor pipe 52 which includes a plurality of distribution laterals, laterals 54a through 54e being shown in FIG. 3. Each lateral is equipped with many holes sized to accommodate anticipated flow rates. Water to be treated spills or sprays out of the laterals and over a column of packing media 56. While the water is trickling over the packing media, an air flow enters the inner tank through air inlets 32 in the inner tank wall 22, and the air flows up through the packing media counter-current to the water flow to vent 26. The aerated water then falls to the bottom of inner tank 14 and exits through pipe 38 into the outer tank for storage. Outlet pipe 38 includes a chlorine injection line 58 so that the aerated water can be chlorinated.

An air pipe 60 is provided in the inner tank for cleaning purposes. In the cleaning mode, air inlets 32 are closed via controls 33 and outlet pipe 38 is closed off, and chlorinated water is pumped into the inner tank by pipe 36 to a level about 4 feet above the normal packing level. Air is then blown through pipe 60 to agitate the packing material for cleaning.

EXAMPLE

A structure is provided having an inner tank 30 feet in diameter located within an outer tank 130 feet in diameter. The outer wall of the outer tank is 30 feet high and the domed roof of the outer tank extends up another 15 feet at center. A water overflow pipe is located at the 30 foot height within the outer tank, and several 2-foot by 3-foot air inlet gates are located in the outer wall of the inner tank just above the 30 foot level.

A number of 15,000 cfm fans with filters are spaced evenly around the periphery of the roof of the outer tank to force air into the space above the water.

The column of packing media in the inner tank is 10 feet high and uses a 25:1 air to water ratio at the peak flow of 24 million gallons per day and a 24-gallon-per-minute per-square-foot water loading rate over the packing media.

A hatch 64 in FIG. 1 is provided in the wall 22 of the inner tank in order to remove packing media by flotation. This hatch 64 is located just above the level of the dome portion 20 of the roof of the outer tank to enable the removed packing media to slide down the roof.

What is claimed is:

1. An installation for treating water to remove dissolved gases therefrom, comprising:

a closed outer tank having a floor and walls for storage of water to a predetermined level therein and defining a space in said outer tank above said predetermined level;

a vented inner tank for water treatment, contained at least partially within the outer tank, and having an outer wall extending above and below said predetermined level;

means for delivering water to be purified from outside the installation to the inner tank, including outlet means disposed in an upper portion of the inner tank;

a column of packing medium for purifying water, said column located in said inner tank and disposed below said outlet means in a manner to allow water from the outlet means to trickle over the column of packing medium for a purifying treatment;

means for agitating said column of packing medium for cleaning thereof;

pipe means in flow connection between said outer tank and a lower portion of said inner tank below said column of packing medium for allowing treated water to pass into said outer tank for storage;

means disposed in a lower portion of said outer tank for removing solids carried into the outer tank in water passed into said outer tank for storage;

outlet means for removing stored water from said outer tank;

means for delivering a predetermined flow of air into said outer tank in said space;

air vent means located in an upper portion of said inner tank above said column of packing medium, said air vent means in flow connection with the atmosphere; and air inlet means in flow connection between said space and an a portion of said inner tank below said column of packing medium, whereby the flow of air passes from said outer tank to said inner tank, through said column of packing medium in countercurrent flow to the water tricking through the column for removing dissolved gases from the water, and through said vent means to the atmosphere.

2. The installation of claim 1, wherein said outer tank and said inner tank are in concentric relationship.

3. The installation of claim 1, wherein said inner tank extends in height above said outer tank.

4. The installation of claim 1, additionally comprising a source of chlorine for injection into treated water, said source in flow connection with said means for removing or with said outer tank.

5. The installation of claim 4, additionally comprising means for immersing said column of packing material in a cleaning medium for cleaning said column.

6. The installation of claim 5, wherein the cleaning medium is chlorinated water.

7. The installation of claim 1, wherein said means for delivering a predetermined flow of air comprises at least one fan.

8. The installation of claim 7, wherein said outer tank comprises a roof portion, and said at least one fan is located on said roof portion outside of said outer tank, a duct means being provided between said at least one fan and said space.

9. The installation of claim 8, wherein said means for delivering a predetermined flow of air comprises a plurality of fans placed peripherally around said roof portion.

10. The installation of claim 1, additionally comprising means for inducing a swirling motion in water passed into said outer tank for storage.

11. The installation of claim 10, wherein the means for inducing a swirling motion comprises said pipe means having at least two outlets therein for delivering water into the outer tank.

12. The installation of claim 1, wherein said means for removing solids comprises a recessed trench disposed radially in the floor of said outer tank.

13. The installation of claim 12, wherein the recessed trench has disposed therein vacuum means for removing solids therefrom.

14. The installation of claim 1, wherein the means for agitating comprises means for delivering an agitating fluid flow to the column.

15. A method for removing dissolved gases from water, comprising the steps of:
 a) disposing an inner water treating tank at least partially within an outer water storage tank;
 b) spraying water to be treated in an upper portion of said inner tank;
 c) aerating said water by allowing the sprayed water to trickle down over a column of packing medium in said inner tank;
 d) providing a flow of air into said outer tank above said predetermined level and passing said air into said inner tank below the column of packing medium, through said column in countercurrent manner to said water, and to the atmosphere;
 e) passing the aerated water from said inner tank to said outer tank for storage up to a predetermined level, with deposition of solids in a lower portion of said outer tank; and
 f) removing the deposited solids from the lower portion of said outer tank.

16. A method according to claim 15, additionally comprising chlorinating water in the outer tank or exiting from the outer tank.

17. A method according to claim 15, additionally comprising passing a cleaning medium into said inner tank, so as to immerse said column of packing medium the cleaning medium, and simultaneously agitating said column of packing medium.

18. The method of claim 17, wherein the cleaning medium comprises chlorinated water.

19. A method according to claim 15, wherein the dissolved gases are selected from the group consisting of hydrogen sulfide, carbon dioxide and mixtures thereof.

20. A method according to claim 15, wherein the dissolved gases include hydrogen sulfide, and the hydrogen sulfide is decomposed by biological action as the water trickles down over the column of packing medium.

* * * * *